(12) United States Patent
Peltonen et al.

(10) Patent No.: US 8,349,060 B2
(45) Date of Patent: Jan. 8, 2013

(54) SCRUBBER WITH MULTIPLE VENTURIS

(75) Inventors: Kimmo Peltonen, Alpharetta, GA (US);
Todd S. Grace, Alpharetta, GA (US)

(73) Assignee: Andritz Inc., Glens Falls, NY (US)

( * ) Notice: Subject to any disclaimer, the term of this patent is extended or adjusted under 35 U.S.C. 154(b) by 720 days.

(21) Appl. No.: 12/336,061

(22) Filed: Dec. 16, 2008

(65) Prior Publication Data
US 2009/0183632 A1 Jul. 23, 2009

Related U.S. Application Data

(60) Provisional application No. 61/019,695, filed on Jan. 8, 2008.

(51) Int. Cl.
*B01D 47/10* (2006.01)
(52) U.S. Cl. ........ 96/275; 96/323; 96/355; 261/DIG. 54
(58) Field of Classification Search .................. None
See application file for complete search history.

(56) References Cited

U.S. PATENT DOCUMENTS

| | | | | |
|---|---|---|---|---|
| 2,797,904 | A * | 7/1957 | Voorheis | 261/23.1 |
| 3,353,334 | A * | 11/1967 | Bergman | 95/196 |
| 3,544,086 | A * | 12/1970 | Willett | 261/62 |
| 3,793,809 | A * | 2/1974 | Tomany et al. | 95/211 |
| 4,460,517 | A * | 7/1984 | Calaceto | 261/23.1 |
| 5,279,646 | A | 1/1994 | Schwab | |
| 5,484,471 | A | 1/1996 | Schwab | |
| 5,512,085 | A | 4/1996 | Schwab | |
| 5,759,233 | A * | 6/1998 | Schwab | 95/8 |

* cited by examiner

*Primary Examiner* — Duane Smith
*Assistant Examiner* — Pankti Patel
(74) *Attorney, Agent, or Firm* — Nixon & Vanderhye P.C.

(57) ABSTRACT

A scrubber removes matter (e.g., particulate, gaseous, or liquid) from a gas stream in order to recover the matter and/or to clean the gas. In particular aspects, the scrubber contains multiple venturis that may provide additional flexibility and increased efficiency. The invention also pertains to related methods.

13 Claims, 2 Drawing Sheets

SCRUBBER WITH MULTIPLE VENTURIS

RELATED APPLICATION

This application claims the benefit of priority to U.S. App. No. 61/019,695 filed on Jan. 8, 2008.

BACKGROUND OF THE INVENTION

In some aspects, this invention generally relates to scrubbers used to remove matter (e.g., particulate, gaseous, or liquid) from a gas stream in order to recover the matter and/or to clean the gas. In particular aspects, this invention relates to a positioning of multiple venturis that may provide additional flexibility and increased efficiency. The invention also pertains to related methods.

Scrubbers—such as those described in U.S. Pat. Nos. 5,279,646; 5,484,471; 5,512,085; and 5,759,233—are known. FIG. 1 of U.S. Pat. No. 5,512,085, for example, shows an example of extant technology.

This system of the '085 patent is quite simple. Gas enters the venturi portion of the scrubber (on the left) where a liquid is sprayed in to the throat of the venturi. In many instances, the diameter of the venturi throat can be approximately 12" to 48".

The purpose of the venturi is to impact the liquid with the matter to be removed. The liquid is then separated from the gas through impact with a liquid level at the bottom of the venturi, and through centrifugal forces in the separator vessel (on the right). There can be a demister at the top of the separator vessel, or external to the separator vessel, to remove any residual liquid droplets.

An advantage of this technology is that it can be very inexpensive. A disadvantage is that it may not be efficient enough to meet gas cleanliness standards set by regulatory agencies. Another disadvantage is that a high pressure drop across the venturi may be required to achieve high efficiency, which costs the mill energy and possibly equipment upgrades.

Other scrubbers are also known. For example, FIG. 1 shows a scrubber that is quite different than the ones mentioned above.

In FIG. 1, the inlet 10 is not a venturi, but rather a duct with spray nozzle(s) 12 used to quench the gases to saturation. In this illustrated device, there are multiple venturis 30 positioned within the separator vessel 20, each with its own spray nozzle 32. These venturis may have throats with a diameter of between 6" and 12". In a preferred embodiment, the venturi may have a throat of approximately 8". There may be a preliminary cleaning step (shown by sprayer 42) and demister(s) 40, as shown in this figure.

An advantage of this system is that it may be highly efficient at a low pressure drop. A disadvantage is that it may be very expensive relative to a system with an external venturi. Another disadvantage is that it may require modification to an existing (e.g., older) vessel in the case of a retrofit project.

In light of the above-identified deficiencies of the prior art, there exists a need for an improved scrubber, particularly a scrubber that enables a good efficiency and reasonable pressure drop.

In certain embodiments, the multiple venturis of the present invention may provide flexibility in scaling up and scaling down the separation process, thus enabling a wider range of operating parameters, process conditions, and loading. The multiple venturis may also facilitate repairs, as each venturi unit may be replaced, repaired, or reconstructed individually. This flexibility may not only reduce downtime, but may also provide flexibility in designing, testing, and evaluating new configurations and devices. Furthermore, at least certain embodiments of the present invention are particularly suitable for relatively inexpensive retrofits to existing equipment.

BRIEF DESCRIPTION OF THE INVENTION

In an embodiment, the present invention generally relates to a system for removing matter from a gaseous stream. The matter may comprise solids, liquids, or gasses. The system for the separation of matter from a gaseous stream may include: a cyclonic separator vessel adapted to receive a first outlet stream and a second outlet stream; and a first venturi external to the cyclonic separator vessel and a second venturi external to the cyclonic separator vessel. The first and second venturis may be arranged in parallel and each adapted to receive a portion of an inlet stream comprising gas and matter to be separated from the gas. The first and second venturis may further be each adapted to receive and distribute a solvent to entrain the matter to be separated from the gas. The first venturi may be adapted to discharge the first outlet stream, and the second venturi may be adapted to discharge the second outlet stream. The first and second outlet steams each include gas and entrained matter to be separated from the gas. The cyclonic separator vessel may be adapted to separate the entrained matter from the gas.

In another embodiment, the present invention relates to a method of separating matter from a gaseous stream. The method may comprise: providing a gaseous stream comprising solid, liquid, or gaseous matter to be removed from the stream; dividing the gaseous stream into two or more gaseous streams; providing at least two venturis, wherein the at least two venturis each comprise a nozzle, an inlet cone, a throat, and an outlet cone; feeding each of the divided streams into one of the at least two venturis; mixing a solvent from the nozzle in at least one of the at least two venturis with the divided stream so as to entrain the matter and facilitate separation in a separator; providing the separator downstream of the at least two venturis; connecting the separator to the at least two venturis; and separating the entrained matter from the gaseous stream in the separator.

In some embodiments, the venturis are identical or may be of different sizes.

DETAILED DESCRIPTION OF THE INVENTION

Figure 1:
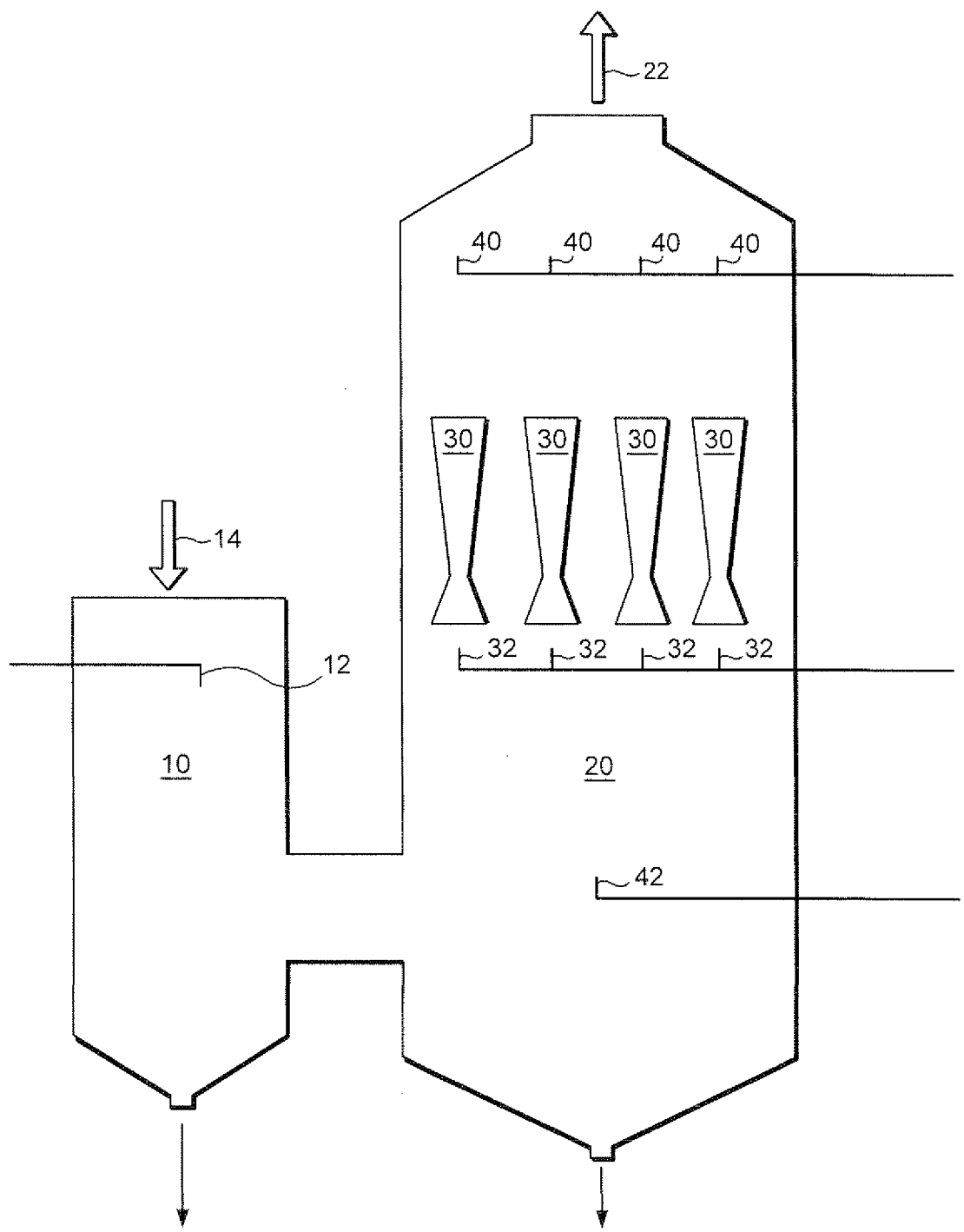
FIG. 1 is a prior art scrubber.

There are three main scrubber applications used in the processing of pulp and paper: kiln, power boiler, and dissolving tank scrubbers. Aside from those primary uses, there are secondary, more minor applications for scrubbers. In various embodiments, this invention relates to primary and secondary scrubber applications. More specifically, this invention may be used in connection with scrubbers intended to remove matter (e.g., particulate, gaseous, or liquid) from a gas stream in order to recover the matter and/or to clean the gas. In one aspect, the scrubber described herein may have particular utility in remediating a gaseous stream containing pollution prior to exhausting to the atmosphere.

In one embodiment, there is a system including multiple venturis (e.g., four venturis) external to the separator vessel.

The gaseous stream containing the matter to be separated (e.g., particulate, gaseous, or liquid matter) may be split across the multiple venturis. As is well understood in the art, a venturi generally includes a gaseous stream being contacted with a liquid emitted from a high pressure spray nozzle. The injected liquid may form droplets that scrub the to-be-separated matter in the gaseous stream. That is, a high pressure spray passing through the venturi throat may form numerous fine liquid droplets that provide turbulent mixing between the gas and liquid phases. A venturi generally has a changing cross-sectional area, which generally decreases then increases. These and other configurations are contemplated within various embodiments of the present invention.

In a preferred embodiment, these venturis would be arranged in parallel, although a series of multiple venturis are also contemplated in other embodiments. Indeed, the multiple venturis may be combined a virtually limitless number of permutations involving venturis in parallel and series.

The multiple venturis thus may provide flexibility in scaling up and scaling down the separation process, thus enabling a wider range of operating parameters, process conditions, and loading. The multiple venturis may also facilitate repairs, as each venturi unit may be replaced, repaired, or reconstructed individually. This flexibility may not only reduce downtime, but may also provide flexibility in designing, testing, and evaluating new configurations and devices. Furthermore, at least certain embodiments of the present invention are particularly suitable for relatively inexpensive retrofits to existing equipment.

In a preferred embodiment involving multiple venturis solely in parallel, each venturi would be responsible for handling a fraction of the incoming gaseous stream containing the matter to be separated. In such an arrangement, the diameter of each venturi may be, for example, approximately 12". In comparison to a single venturi, there may not be a direct correlation between the fraction of incoming gaseous stream and diameter. That is, the diameter or cross-sectional area of each venturi may depend on a number of different factors, including, for example, angles of the venturi's inlet and outlet cones, length of the venturi's throat, pressure drop, etc.

Figure 2:
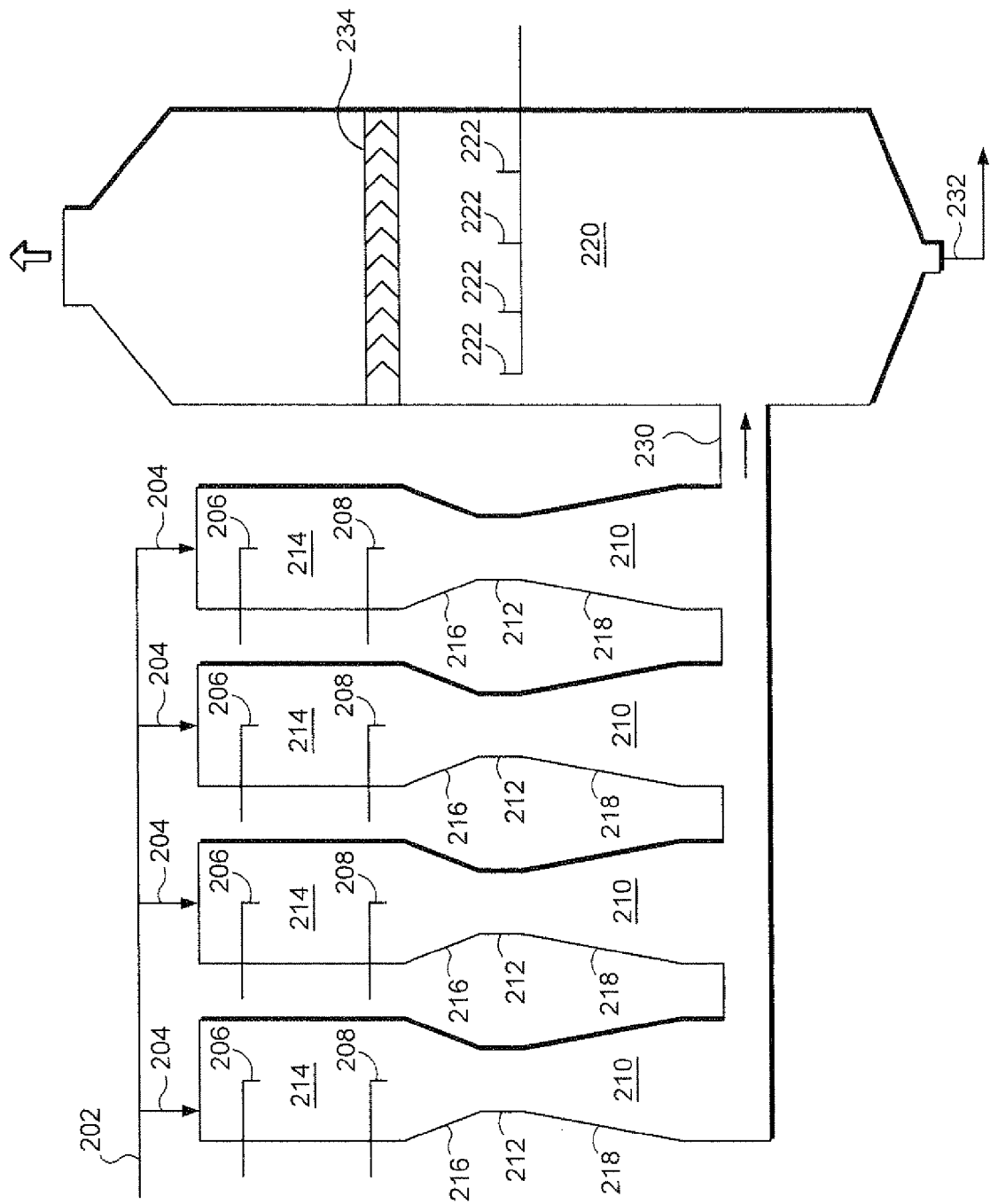
FIG. 2 illustrates a scrubber in accordance with an exemplary embodiment of the present invention.

A preferred embodiment is schematically illustrated in FIG. 2. This embodiment illustrates four venturis in parallel, though other permutations involving greater and fewer venturis as well as venturi(s) in series are also contemplated. For example, certain embodiments of the present invention may include two, three, four, five, six, seven, eight, nine, ten, or more venturis, solely in parallel or in parallel and in series.

FIG. 2 illustrates an overall air pollution control system including multiple venturis and a separator. A contaminant-laden gaseous stream is generated by a source (not shown). This source may be involved in pulp and paper-making, such as, for example, a kiln. The gaseous stream may have liquid, solid, or gaseous matter entrained therein, including gaseous contaminants that may condense as the gaseous stream is cooled (if heated).

The gaseous stream enters via conduit 202, which is split (either evenly or unevenly) among four streams into conduits 204. Although the division is depicted as a series (i.e., with a fraction of conduit 202 being sectioned off at each conduit 204), it is possible to use other arrangements, such as a parallel division into four streams at a singular node. If heated, the gaseous stream may be cooled to a lower temperature in forechambers 214 prior to entering venturis 210. This cooling may occur with water or other liquid(s) emitted from nozzles 206. This cooling may lower the temperature of the gaseous stream to approximately the saturation temperature.

The nozzles 206 may be positioned remotely from the entrance to the throats 212 of the venturis. After flowing through forechambers 214, the effluent enters the venturi scrubbers 210 comprising entrance cones 216, throats 212 and an exit cone 218. The scrubbing liquid for the venturi is provided by the spray from nozzles 208. In some instances, nozzles 208 may be two-fluid nozzles which form a spray of scrubbing liquid having droplets which are optimized for maximum collection of optically active particles. In some embodiments, nozzles 208 may be connected to a source of water or other solvent and a source of compressed air.

The entrance or inlet cones 216 may have a wide range of angles. In some embodiments, the angle of the inlet cone may be between 60° and 90°, and in other embodiments, the angle of the inlet cone may be between 30° and 45° or between 45° and 60°. A relatively larger angle may require an increase in energy required to move gas through the venturi, though it may also improve scrubbing efficiency by maximizing the differential velocity between the contaminant particles and the scrubbing droplets.

The outlet cones 218 may be relatively long, which may maximize the recovery of energy from both the gas flow and from the droplets. Scrubbing may also occur in the outlet cone as the scrubbing droplets and any remaining contaminant particles decelerate at different rates. The precise configuration of the venturis, including the angles of the inlet cones and outlet cones, and the cross-sectional area may vary according to different embodiments of the present invention. Any suitable configuration of venturi(s) may be used.

The spray from nozzles 206 may introduce the scrubbing liquid relatively uniformly into the gaseous stream, such that cooling is uniformly achieved and the gas flow and the scrubbing liquid form an homogenous mixture when they enter the venturis 210. In some embodiments, the differential velocity between the spray droplets and the gas flow at the point of introduction is low. Depending on the embodiments, the spray may or may not assist the flow of gases through the venturis.

It should be appreciated that the venturis 210 need not be identical, and that different sized venturis may be used. In such an embodiment, each venturi may be designed to handle a different flowrate and/or composition of the gaseous stream. In this respect, furthermore, individual venturis may be brought online as necessary according to varying process conditions and/or loading. In yet further embodiments, there may be greater than or less than four venturis in series and/or parallel.

After leaving the exit cones 218 of the venturis 210, the contaminant laden spray droplets are removed from the effluent stream. In the exemplary system depicted in FIG. 2, a cyclonic separator 220 and a mist eliminator 234 and nozzles 222 may be used to remove the contaminated spray droplets from the effluent gas flow. Sprays from a plurality of nozzles 222 may be introduced into the gas flow just upstream of the mist eliminator 234 to keep the surface of the mist eliminator wet and clean. The operation of cyclonic separators and of mist eliminators are well known to those skilled in the art and any suitable configuration may be used in connection with the invention described herein. Because the mixture of the gaseous stream and spray droplets may have been reduced to substantially saturation temperature, there may be little or no evaporation of the scrubbing droplets after they exit the venturis.

As depicted in FIG. 2, streams exit from each venturi 210 and connect to cyclonic separator 220 via conduit 230.

Stream 232 exits from separator 220 and may be further cleaned and/or recycled to various processes, in accordance with various embodiments.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A system for the separation of matter from a gaseous stream comprising:
   a cyclonic separator vessel adapted to receive a first outlet stream and a second outlet stream; and
   a first venturi external to the cyclonic separator vessel and a second venturi external to the cyclonic separator vessel, wherein the first and second venturis are arranged in parallel and each are adapted to receive a portion of an inlet stream comprising gas and matter to be separated from the gas and each are adapted to separately receive and separately distribute a first liquid and a second liquid, the first liquid being distributed by a first nozzle and the second liquid being distributed by a second nozzle, the first liquid being a cooling liquid for cooling the inlet stream, the second liquid being a solvent used as a scrubbing liquid to entrain the matter to be separated from the gas and wherein the first venturi is adapted to discharge the first outlet stream and the second venturi is adapted to discharge the second outlet stream, wherein the first and second outlet steams each include gas and entrained matter to be separated from the gas;
   wherein the cyclonic separator vessel is adapted to receive the gas and the entrained matter from the first external venturi and second external venturi and adapted to separate the entrained matter from the gas, the cyclonic separator vessel having separate first and second exits, wherein the first exit is configured to remove the gas from the cyclonic separator vessel, and the second exit is configured to remove the entrained matter from the cyclonic separator;
   wherein the first venturi and the second venturi each comprise a nozzle, an inlet cone, a throat, and an outlet cone; and
   wherein the inlet cone of the first or second venturi has an angle between 45° and 60°, wherein the first venturi has an inlet cone angle that varies from the inlet cone angle of the second venturi.

2. The system of claim 1, wherein the matter to be separated from the gas comprises solid, liquid, or gaseous matter.

3. The system of claim 1, wherein the matter to be separated from the gas comprises solid matter generated in a process relating to pulp and paper-making.

4. The system of claim 1, wherein the first venturi and the second venturi each comprise a nozzle, an inlet cone, a throat, and an outlet cone.

5. The system of claim 4, wherein the throat of the first or second venturi has a diameter of between 6 inches and 12 inches.

6. A system for the separation of matter from a gaseous stream comprising:
   a cyclonic separator vessel adapted to receive a first outlet stream and a second outlet stream; and
   a first venturi external to the cyclonic separator vessel and a second venturi external to the cyclonic separator vessel, wherein the first and second venturis are arranged in parallel and each are adapted to receive a portion of an inlet stream comprising gas and matter to be separated from the gas and each are adapted to separately receive and separately distribute a first liquid and a second liquid, the first liquid being distributed by a first nozzle and the second liquid being distributed by a second nozzle, the first liquid being a cooling liquid for cooling the inlet stream, the second liquid being a solvent used as a scrubbing liquid to entrain the matter to be separated from the gas and wherein the first venturi is adapted to discharge the first outlet stream and the second venturi is adapted to discharge the second outlet stream, wherein the first and second outlet steams each include gas and entrained matter to be separated from the gas;
   wherein the cyclonic separator vessel is adapted to receive the gas and the entrained matter from the first external venturi and second external venturi and adapted to separate the entrained matter from the gas, the cyclonic separator vessel having separate first and second exits, wherein the first exit is configured to remove the gas from the cyclonic separator vessel, and the second exit is configured to remove the entrained matter from the cyclonic separator;
   wherein the first venturi and the second venturi each comprise a nozzle, an inlet cone, a throat, and an outlet cone; and
   wherein the inlet cone of the first or second venturi has an angle between 60° and 90°, wherein the first venturi has an inlet cone angle that varies from the inlet cone angle of the second venturi.

7. A system for the separation of matter from a gaseous stream comprising:
   a cyclonic separator vessel adapted to receive a first outlet stream and a second outlet stream; and
   a first venturi external to the cyclonic separator vessel and a second venturi external to the cyclonic separator vessel, wherein the first and second venturis are arranged in parallel and each are adapted to receive a portion of an inlet stream comprising gas and matter to be separated from the gas and each are adapted to separately receive and separately distribute a first liquid and a second liquid, the first liquid being distributed by a first nozzle and the second liquid being distributed by a second nozzle, the first liquid being a cooling liquid for cooling the inlet stream, the second liquid being a solvent used as a scrubbing liquid to entrain the matter to be separated from the gas and wherein the first venturi is adapted to discharge the first outlet stream and the second venturi is adapted to discharge the second outlet stream, wherein the first and second outlet steams each include gas and entrained matter to be separated from the gas;
   wherein the cyclonic separator vessel is adapted to receive the gas and the entrained matter from the first external venturi and second external venturi and adapted to separate the entrained matter from the gas, the cyclonic separator vessel having separate first and second exits, wherein the first exit is configured to remove the gas from the cyclonic separator vessel, and the second exit is configured to remove the entrained matter from the cyclonic separator;
   wherein the first venturi and the second venturi each comprise a nozzle, an inlet cone, a throat, and an outlet cone; and
   wherein the inlet cone of the first or second venturi has an angle between 30° and 45°, wherein the first venturi has an inlet cone angle that varies from the inlet cone angle of the second venturi.

8. The system of claim 1, wherein the solvent is water.

9. The system of claim 1, further comprising a third venturi external to the cyclonic separator vessel, wherein the third venturi is arranged in parallel with the first and second venturis and is adapted to receive a portion of an inlet stream comprising gas and matter to be separated from the gas and is adapted to receive and distribute a solvent to entrain the matter to be separated from the gas and wherein the third venturi is adapted to discharge a third outlet stream, wherein the third outlet steam includes gas and entrained matter to be separated from the gas and wherein the cyclonic separator vessel is adapted to receive the third outlet stream.

10. The system of claim 9, further comprising a fourth venturi external to the cyclonic separator vessel, wherein the fourth venturi is arranged in parallel with the first, second, and third venturis and is adapted to receive a portion of an inlet stream comprising gas and matter to be separated from the gas and is adapted to receive and distribute a solvent to entrain the matter to be separated from the gas and wherein the fourth venturi is adapted to discharge a fourth outlet stream, wherein the fourth outlet steam includes gas and entrained matter to be separated from the gas and wherein the cyclonic separator vessel is adapted to receive the fourth outlet stream.

11. The system of claim 1, wherein the cyclonic separator vessel is adapted to receive a combined stream comprising the first outlet stream and the second outlet stream.

12. The system of claim 1, wherein the inlet stream is divided unevenly between the first venturi and the second venturi such that the first venturi and the second venturis are adapted to receive nonequal flowrates of the gas inlet stream and such that the first venturi and the second venturis have different sizing according to the different flowrates of the gaseous inlet stream.

13. The system of claim 1, wherein the entire inlet stream is directed to the first venturi.

\* \* \* \* \*